United States Patent [19]

Brinkmann et al.

[11] 4,274,062
[45] Jun. 16, 1981

[54] DYESTUFF LASER

[75] Inventors: Uwe Brinkmann; Helmut Telle, both of Cologne; Roderich Raue, Leverkusen; Carl-Wolfgang Schellhammer, Bergisch-Gladbach, all of Fed. Rep. of Germany

[73] Assignee: Bayer Aktiengesellschaft, Leverkusen, Fed. Rep. of Germany

[21] Appl. No.: 866,522

[22] Filed: Jan. 3, 1978

[30] Foreign Application Priority Data

Jan. 5, 1977 [DE] Fed. Rep. of Germany ....... 2700292

[51] Int. Cl.$^2$ ................................................ H01S 3/20
[52] U.S. Cl. ............................ 331/94.5 L; 252/301.17
[58] Field of Search ................ 331/94.5 L; 252/301.17

[56] References Cited

U.S. PATENT DOCUMENTS 3,984,399  10/1976  Weber et al. ......................... 542/459
4,072,911  2/1978   Hartig et al. ..................... 331/94.5 L

FOREIGN PATENT DOCUMENTS 7607198  1/1977  Netherlands ......................... 331/94.5 L

OTHER PUBLICATIONS

Majewski et al., "Laser Properties . . . ", Optics Communications, vol. 18, No. 3, Aug. 1976, pp. 255-259.
F. P. Schaefer, ed: Dye Lasers (Springer-Verlag, N.Y. & Heidelberg, 1973), pp. 180-181, 262-263, 265.

Primary Examiner—William D. Larkins
Attorney, Agent, or Firm—Sprung, Felfe, Horn, Lynch & Kramer

[57] ABSTRACT

Laser light in the wavelength range of 400 - 480 Nm is obtained with a dyestuff laser containing a dyestuff of the general formula

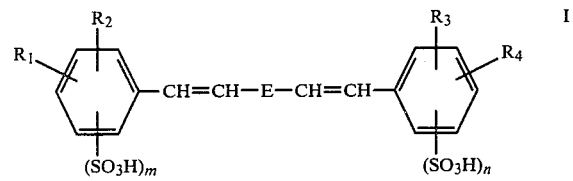

wherein
E denotes one of the radicals

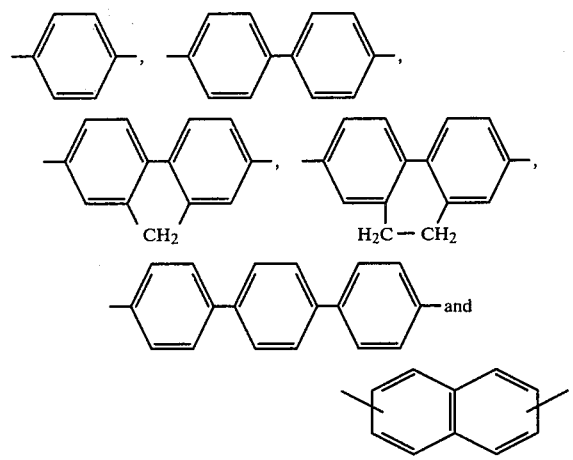

$R_1$–$R_4$ independently of one another denote hydrogen, alkyl, trifluoromethyl, alkoxy, aralkoxy, halogen, alkenyloxy, the carboxyl, cyano, alkylsulphone, arylsulphone, carboxamide or sulphonamide group or the carboxylic acid ester group, or $R_1$ and $R_2$, or $R_3$ and $R_4$, conjointly represent a fused benzene ring and m and n independently of one another denote 0, 1 or 2, with the proviso that the radical E contains at least one sulphonic acid group if m and n represent 0, and wherein
the radical E can be further substituted, in a solvent which does not interfere with the emission, at a concentration, which emits laser beams, of, preferably, $10^{-2}$ to $10^{-5}$ mols/liter.

6 Claims, 4 Drawing Figures

DYESTUFF LASER

The subject of the invention is a process for the production of coherent monochromatic radiation (laser light), the frequency of which can be changed, by means of a dyestuff laser which consists of a reservoir for the dyestuff solution and an energy source, associated therewith, which is capable of exciting the dyestuff solution to produce an emission, the radiation produced being in the wavelength range of 400–480 nm.

A laser is a light intensification device by means of which it is possible to produce coherent monochromatic light of a high spectral and geometric intensity density. The laser consists of an optical resonator which contains the liquid laser-active material in a thin-walled quartz cylinder. The cylinder is usually part of a closed system through which the dyestuff solution is circulated by pumping whilst the laser is in operation. This avoids localised overheating, which leads to optical inhomogeneities.

The excitation of the dyestuffs is effected with the aid of energy sources, by means of electrons or light, and the dyestuff laser can also be excited by a gas laser, for example a nitrogen laser or argon laser.

The excitation, which is also termed optical pumping, has the effect of raising the electrons of the molecule of the laser dyestuff from their normal state to a high energy state, from which a radiation transition takes place. If the number of molecules present in the excited state exceeds that of the molecules in lower states, this gives rise to stimulated transitions, by means of which the light is intensified in the optical resonator.

If one of the laser mirrors is partially transparent to light, a part of the radiation leaves the apparatus in the form of a laser beam. Dyestuffs which can be excited particularly easily exhibit the phenomenon of "super radiance" with highly effective excitation. This can be observed, for example, if a quartz cell containing the solution of such a dyestuff is placed in the beam of a nitrogen laser. The solution then emits laser light without being located between resonator mirrors.

A considerable advantage of the dyestuff laser compared with solid or gas lasers is its ability to supply laser radiation of a frequency which can be changed. Because of the width of the fluorescence band of the dyestuffs employed, dyestuff lasers can be so tuned, by inserting a frequency-selective element, for example a reflection grating or a prism, that laser light is emitted at any desired wavelength within the entire fluorescence band of the dyestuff.

Although a large number of suitable dyestuffs has already been proposed, there is, nevertheless, still a considerable lack in many regions of the visible wavelength range of compounds which give a very high degree of effectiveness of the laser.

Accordingly, the subject of the invention is a dyestuff laser consisting of a reservoir, with a laser dyestuff solution contained therein, and a pump light source connected thereto, which is capable of exciting the dyestuff solution to produce an emission, characterised in that the dyestuff solution contains a dyestuff which, in the form of the free acid, corresponds to the general formula

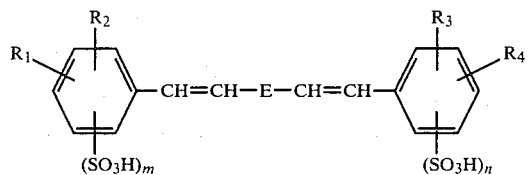

wherein
E denotes one of the radicals

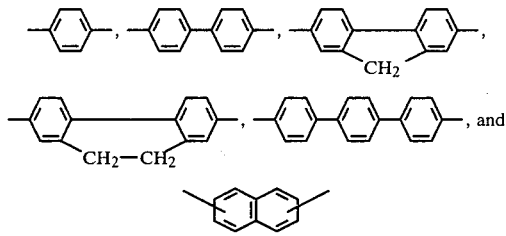

$R_1$–$R_4$ independently of one another denote hydrogen, alkyl, trifluoromethyl, alkoxy, aralkoxy, alkenyloxy, halogen, the carboxyl, cyano, alkylsulphone, arylsulphone, carboxamide or sulphonamide group or the carboxylic acid ester group, or $R_1$ and $R_2$, or $R_3$ and $R_4$, conjointly represent a fused benzene ring and m and n independently of one another denote 0, 1 or 2, with the proviso that the radical E contains at least one sulphonic acid group is m and n represent 0,
and wherein
the radical E can be further substituted, in a solvent which does not interfere with the emission, at a concentration, which emits laser beams, of, preferably, $10^{-2}$ to $10^{-5}$ mols/liter.

Examples which may be mentioned of substituents for the radical E are: $C_1$–$C_5$-alkyl radicals which can be further substituted by hydroxyl, cyano, halogen or phenyl, such as methyl, ethyl, cyanoethyl, tert.-butyl and benzyl, halogen atoms, such as chlorine, bromine or fluorine and preferably chlorine, $C_1$–$C_5$-alkoxy radicals, such as methoxy, ethoxy, butoxy and isopropoxy; allyloxy; benzyloxy, $C_1$–$C_5$-alkylsulphonyl radicals which are optionally substituted by hydroxyl, such as methylsulphonyl, ethylsulphonyl, n-butylsulphonyl and β-hydroxy-ethylsulphonyl, the benzylsulphonyl radical, the phenylsulphonyl radical, carboxamide and sulphonamide groups which are optionally monosubstituted or disubstituted by $C_1$–$C_4$-alkyl radicals, and also carboxylic acid $C_1$–$C_4$-alkyl ester groups.

Suitable alkyl $R_1$–$R_4$ is, in particular, $C_1$–$C_2$-alkyl, suitable alkoxy $R_1$–$R_4$ is, in particular, $C_1$–$C_2$-alkoxy, suitable aralkoxy $R_1$–$R_4$ is, in particular, benzyloxy and suitable alkenyloxy $R_1$–$R_4$ is, in particular, $C_2$–$C_4$-alkenyloxy.

Alkylsulphonyl $R_1$–$R_4$ is understood, preferably, as $C_1$–$C_4$-alkylsulphonyl and arylsulphonyl $R_1$–$R_4$ is understood, preferably, as phenylsulphonyl. The carboxamide and sulphonamide groups $R_1$–$R_4$ $_L$ can be monosubstituted or disubstituted by $C_1$–$C_4$-alkyl radicals.

Carboxylic acid ester groups $R_1$–$R_4$ are understood, preferably, as the $C_1$–$C_4$-alkyl esters The compounds of the formula I can be employed as free acids or in the form of metal salts or organic ammonium salts.

Possible cations for the salts are monovalent or divalent metals, such as sodium, potassium, lithium, magnesium, calcium, barium, manganese and zinc, and ammonium compounds which are obtained by reacting the acids on which the salts are based with mono-, di- and tri-methylamine, mono-, di- and tri-ethylamine, mono-, di- and tri-ethanolamine, methyldiethanolamine, ethyldiethanolamine, dimethyl-ethanolamine, diethylethanolamine, mono-, di- and tri-isopropanolamine, methyl-di-isopropanolamine, ethyl-di-isopropanolamine, di-methyl-isopropanolamine, n-butylamine, sec.-butylamine, dibutylamine and di-isobutylamine.

Preferred laser dyestuffs of the formula I correspond, in the form of the free acid, to the formula

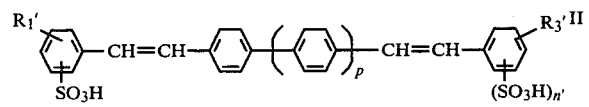

wherein
$R_1'$ and $R_3'$ independently of one another represent hydrogen, methyl or chlorine and
$n'$ and $p$ represent 0 or 1.

A particularly preferred laser dyestuff corresponds, in the form of the free acid, to the formula

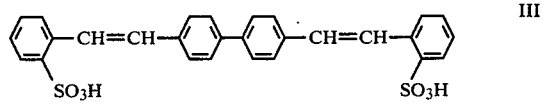

Examples of solvents which do not hinder the stimulated emission and can be used according to the invention are water, monohydric and polyhydric alcohols, for example methanol, ethanol, isopropanol, butanol and ethylene glycol, glycol monoethyl ether, cyclic ethers, such as tetrahydrofurane and dioxane, esters, such as glycol diacetate, diethyl carbonate and fluorinated alcohols, for example hexafluoroisopropanol.

The use of solvent mixtures, especially mixtures of alcohols with water, is likewise possible.

In water, a number of the compounds according to the invention display a reduction in the laser activity as a result of the formation of associates. In this case, the laser activity can be increased by the addition of surface-active compounds, especially non-ionic emulsifiers, for example the reaction products of $C_9$-$C_{12}$-alkylphenols, phenylalkylphenols, oxydiphenyl, oleyl alcohol or longer-chain aliphatic alcohols with 6–50 mols of ethylene oxide.

In recent years laser light from lasers which have a frequency which can be changed has attained considerable importance in spectroscopy. The lasers can be employed for analytical purposes, high resolution spectroscopy, fluorescence spectroscopy, absorption spectroscopy, life measurements and photoionisation and in the spectroscopy of negative ions. They are also of great technical importance in information techniques, in environmental protection and for the separation of isotopes.

REFERRING TO THE ANNEXED DRAWINGS,

A number of the compounds according to the invention show, as a particular advantage, the effect of "super radiance".

The preparation of the compounds according to the invention is effected by reacting aromatic aldehydes with arylmethanephosphonic acid esters in a known manner.

EXAMPLE 1

The laser activity of the compound of the formula

Figure 1:
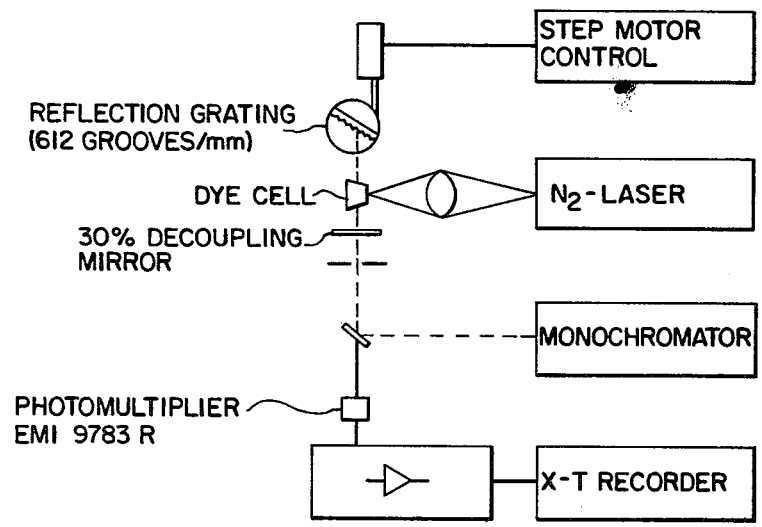
FIG. 1 shows a typical arrangement of components used to measure laser activity of a laser dye according to the invention.

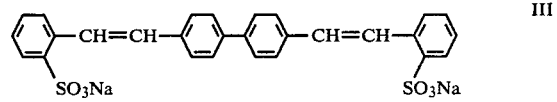

was examined in a measuring apparatus according to FIG. 1. The nitrogen laser used had a wavelength of 337 nm, a pulse frequency of 60 Hz, a pulse width $\Delta\tau$ of 7 nsec and a pulse power of 100 kW.

The compound of the above formula was pumped, in a concentration of $1.7\times10^{-3}$ mol/liter of methanol, from a reservoir through the dyestuff cell. The frequency of the wavelength was varied by a reflection grating with a step motor drive. The laser spectrum was recorded via a photomultiplier and a recorder and the wavelength was calibrated via the monochromator. In order to measure the power, the photomultiplier was replaced by a thermopile measuring head with an ancillary measuring amplifier. The intensity in percent of the pump power is also given in kW since the initial pulse power was 100 kW.

Figure 2:
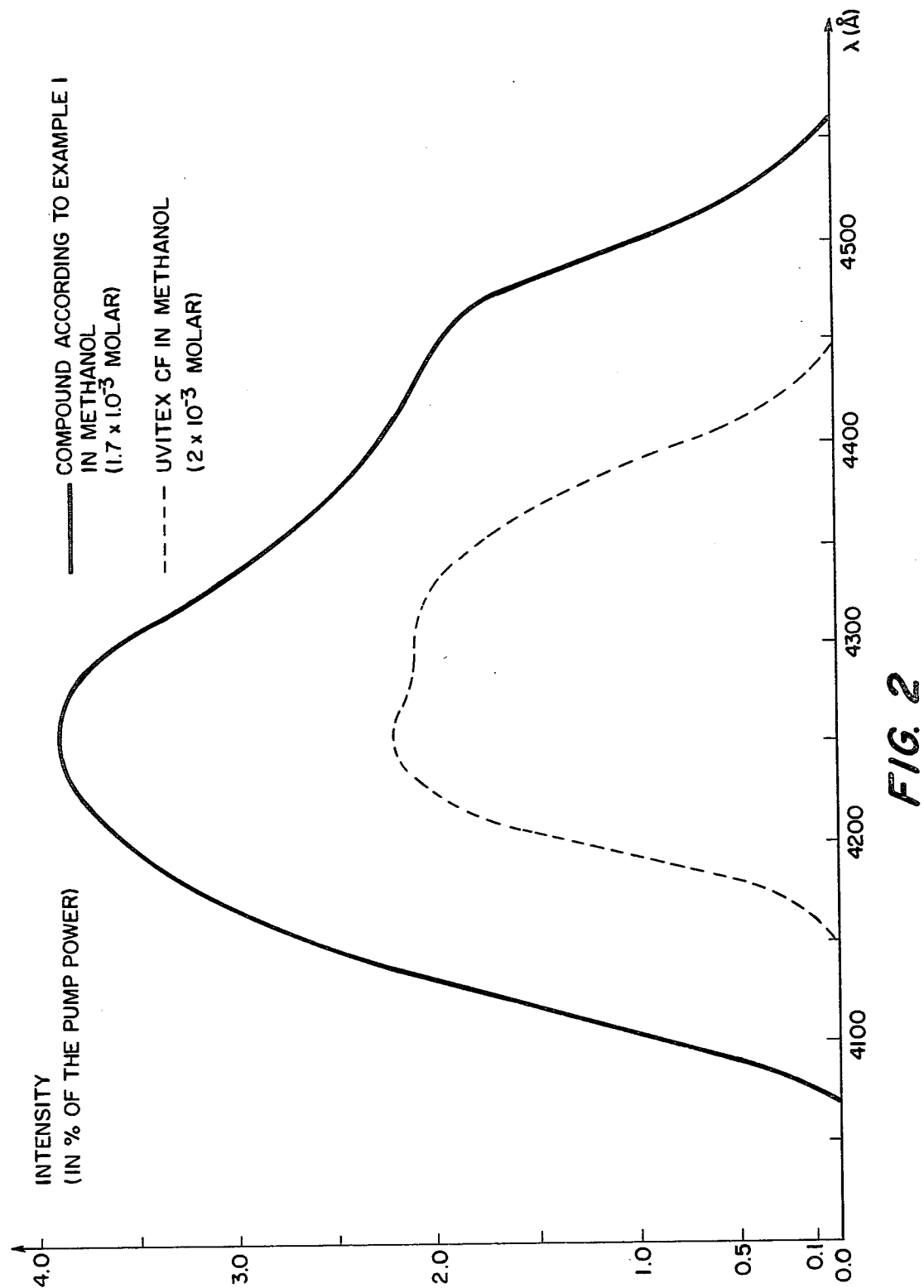
FIGS. 2 and 3 show laser power as a function of wavelength for two dyes according to the present invention, each in comparison to a known laser dye; and, FIG. 4 shows the effect of adding an emulsifier to a laser dye according to the present invention.

The dependence of the laser power on the wavelength is given in FIG. 2. The laser power curve of Uvitex CF, the laser activity of which is described in Optics Communications 18, 3 page 256 (August 1976), serves as a comparison.

The compound according to the invention displays a higher power over a considerably wider wavelength range.

Similarly good results are obtained when fluorescence dyestuffs of the following formula

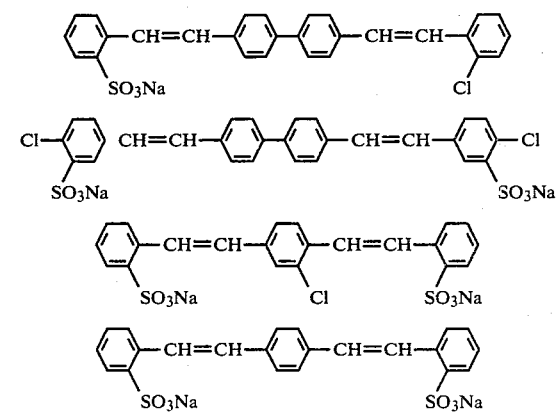

-continued

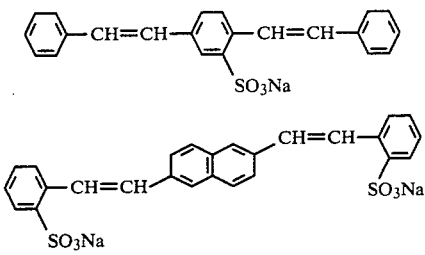

are employed in the same measuring apparatus in place of the compound indicated above.

EXAMPLE 2

The laser activity of the compound of the formula

Figure 3:
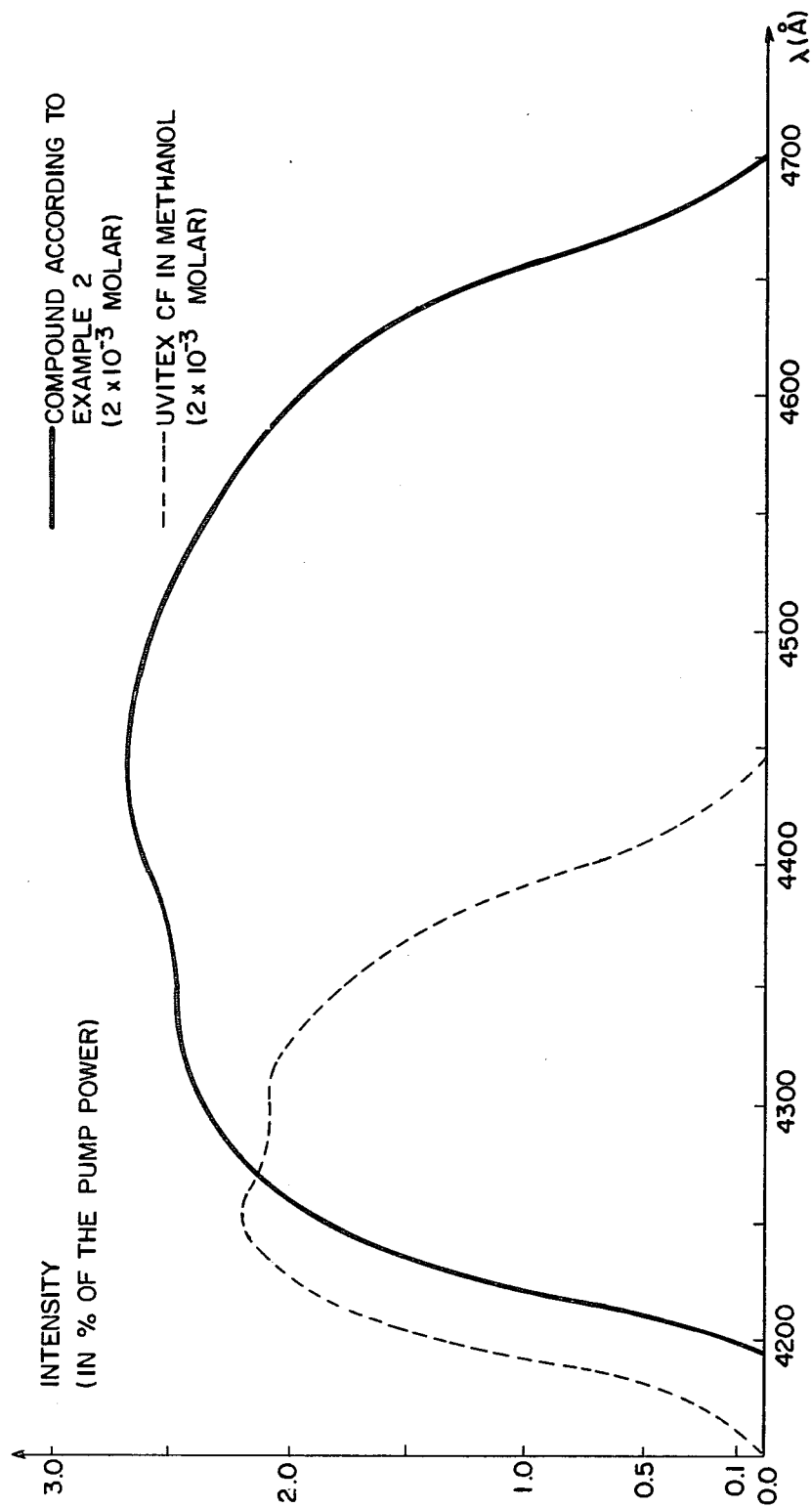

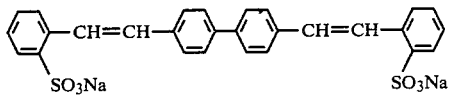

was examined in a measuring apparatus according to FIG. 1. The solvent used in this case was water. The concentration of the laser dyestuff was $2 \times 10^{-3}$ mol/liter. The dependence of the laser power on the wavelength is given in FIG. 3. The laser power curve of Uvitex CF in methanol serves for comparison, since Uvitex CF has no laser activity in water.

EXAMPLE 3

Figure 4:
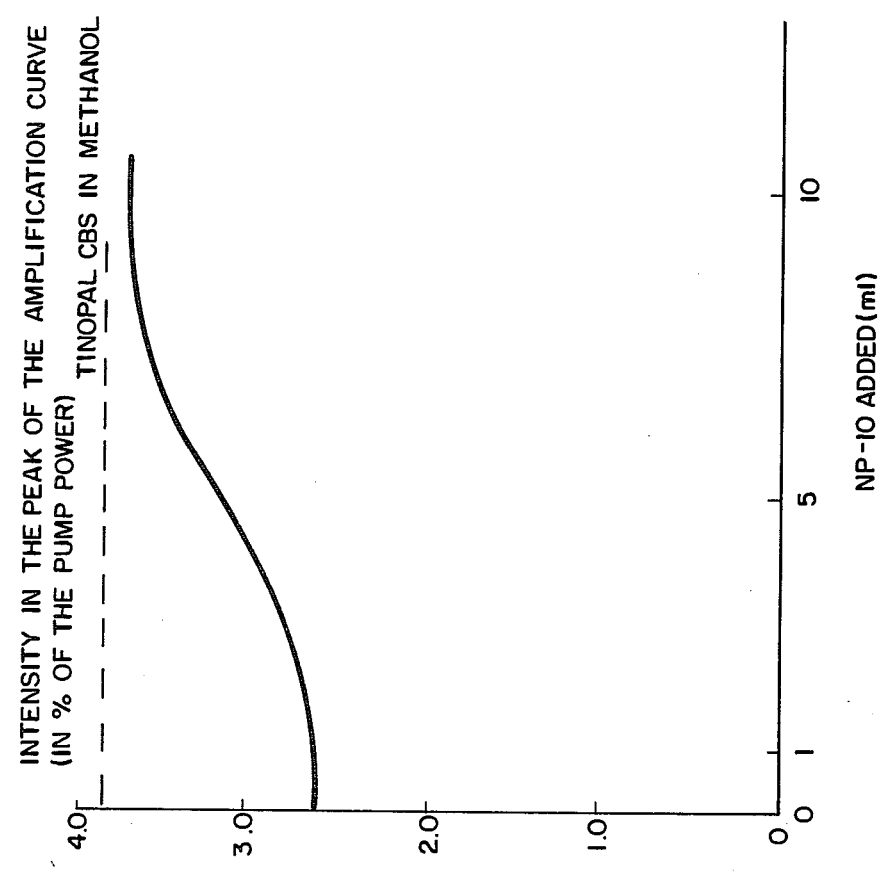

The dyestuff solution described in Example 2 is employed in the same apparatus as in Example 1 and 2. 1 to 10 ml of an emulsifier which is obtained by reacting nonphenol with 10 mols of ethylene oxide are added, per liter, to the dyestuff solution. As the amounts of emulsifier added increase, the laser power, which is somewhat lower in water, approaches the laser power in methanol, as is shown in FIG. 4. (NP 10=nonylphenol reacted with 10 mols of ethylene oxide).

We claim:

1. Dyestuff laser consisting of a reservoir, with a laser dyestuff solution contained therein, and a pump light source connected thereto, which is capable of exciting the dyestuff solution to produce an emission, characterised in that the dyestuff solution contains a dyestuff which, in the form of the free acid corresponds to the formula

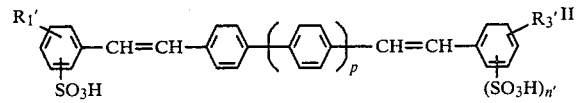

wherein
  $R_1'$ and $R_3'$ independently of one another represent hydrogen, methyl or chlorine and
  $n'$ and $p$ each represent 1,
in a solvent which does not interfere with the emission, at a concentration, which emits laser beams, of, preferably, $10^{-2}$ to $10^{-5}$ mols/liter.

2. A dyestuff laser according to claim 1 which in the free acid form has the following formula:

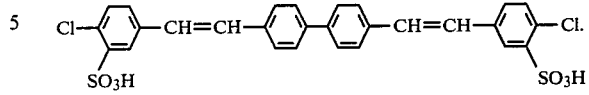

3. Dyestuff laser consisting of a reservoir, with a laser dyestuff solution contained therein, and a pump light source connected thereto, which is capable of exciting the dyestuff solution to produce an emission, characterised in that the dyestuff solution contains a dyestuff which, in the form of the free acid corresponds to the formula

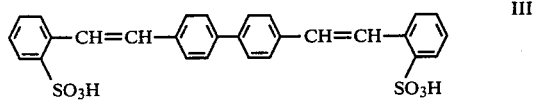

in a solvent which does not interfere with the emission, at a concentration, which emits laser beams, of, preferably, $10^{-2}$ to $10^{-4}$ mols/liter.

4. A process for producing an emission which comprises pumping light into a reservoir containing a laser dyestuff solution, the dyestuff of said solution being one which, in the form of the free acid corresponds to the general formula

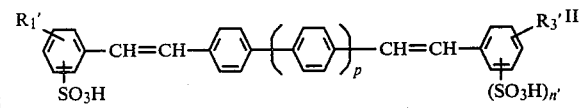

wherein
  $R_1'$ and $R_3'$ independently of one another represent hydrogen, methyl or chlorine and
  $n'$ and $p$ each represent 1,
whereby there is produced a coherent laser emission in the wave length range of 400 to 480 nm.

5. A process according to claim 4 wherein the dyestuff in the free acid form corresponds to the formula:

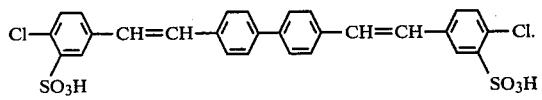

6. A process for producing an emission which comprises pumping light into a reservoir containing a laser dyestuff solution, the dyestuff of said solution being one which, in the form of the free acid corresponds to the general formula

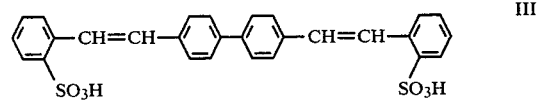

wherein there is produced a coherent laser emission in the wave length range of 400 to 480 nm.

* * * * *